(12) United States Patent
Kang et al.

(10) Patent No.: US 10,911,711 B2
(45) Date of Patent: Feb. 2, 2021

(54) STAND AND DISPLAY APPARATUS HAVING THE SAME

(71) Applicant: LG ELECTRONICS INC., Seoul (KR)

(72) Inventors: Hyunjung Kang, Seoul (KR); Hyungkwon Yun, Seoul (KR); Sangtae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/525,695

(22) Filed: Jul. 30, 2019

(65) Prior Publication Data
US 2020/0099884 A1 Mar. 26, 2020

(30) Foreign Application Priority Data
Sep. 20, 2018 (KR) .................. 10-2018-0113317

(51) Int. Cl.
*H04N 5/645* (2006.01)
*H04N 5/655* (2006.01)
*H04N 1/00* (2006.01)
*G06F 1/16* (2006.01)

(52) U.S. Cl.
CPC .......... *H04N 5/645* (2013.01); *G06F 1/1652* (2013.01); *G06F 1/1654* (2013.01); *H04N 1/00562* (2013.01); *H04N 5/655* (2013.01)

(58) Field of Classification Search
None
See application file for complete search history.

(56) References Cited

U.S. PATENT DOCUMENTS

| | | | |
|---|---|---|---|
| 2016/0021769 A1* | 1/2016 | Shin ....................... | F16M 11/16 361/679.01 |
| 2017/0064851 A1* | 3/2017 | Shin ....................... | F16M 11/22 |
| 2017/0118850 A1* | 4/2017 | Kwon .................... | F16M 13/00 |
| 2017/0241590 A1* | 8/2017 | Boubli ................ | F16M 11/041 |
| 2017/0265321 A1* | 9/2017 | Park ...................... | H05K 5/0234 |
| 2017/0374754 A1* | 12/2017 | Kim ....................... | H05K 5/0234 |

* cited by examiner

*Primary Examiner* — Rebecca A Volentine
(74) *Attorney, Agent, or Firm* — Birch, Stewart, Kolasch & Birch, LLP (57) ABSTRACT

A stand of a display apparatus includes a fixer to detachably insert a lower end of a glass cover therein, a fixer inserting body to detachably insert the fixer therein, and a pressing body positioned inside the fixer inserting body and pressing the fixer. The fixer inserting body is formed therein with a fastening member coupling hole to be coupled to at least one fastening member to press the pressing body.

17 Claims, 9 Drawing Sheets

STAND AND DISPLAY APPARATUS HAVING THE SAME

CROSS-REFERENCE TO RELATED APPLICATIONS

This application claims priority to Korean Patent Application No. 10-2018-0113317 filed on Sep. 20, 2018 in Korea, the entire contents of which is hereby incorporated by reference in its entirety.

BACKGROUND

The present invention relates to a stand to support a display apparatus.

A display apparatus includes a liquid crystal display (LCD), a field emission display (FED), a plasma display panel (PDP), and an electroluminescence device.

As an example of an electroluminescence device, an active matrix type organic light emitting display using an organic light emitting diode (OLED) is commercially available. Since the organic light emitting display is a self-emission device, the organic light emitting display has no backlight, and has advantages in response speed, or viewing angle when compared to the LCD. Accordingly, the organic light emitting display has been spotlighted as a next generation display.

Meanwhile, in general, the display apparatus may include a display panel, a module cover, a back cover, and a stand. A conventional stand is generally coupled to an injection or press member contained in the back cover or the module cover by using a fastening member.

However, when the coupling method using the fastening member is applied to the glass cover instead of the injection or the press member, the glass cover may be broken. In other words, it may be difficult to directly couple the stand to the glass cover.

SUMMARY

The present invention is to provide a stand to fix a glass cover of a display apparatus.

The present invention is to provide a stand which is easily mounted and separated.

The present invention is to provide a display apparatus which is improved in an aesthetic impression and selectively used in a sand type or a wall-mount type.

According to an embodiment of the present invention, a stand of a display apparatus may include a fixer to detachably insert a lower end of a glass cover therein, a fixer inserting body to detachably insert the fixer therein, and a pressing body positioned inside the fixer inserting body and pressing the fixer. The fixer inserting body is formed therein with a fastening member coupling hole to be coupled to a fastening member to press the pressing body.

The stand may further include an elastic member positioned inside the fixer inserting body and providing elastic force to the pressing body in a direction of pressing the fixer.

The pressing body may make surface contact with the fixer.

The fixer inserting body may include a lower body to support a lower end of the fixer, a front body protruding upward from the lower body to make contact with a front surface of the fixer, and a rear body spaced apart from the front body, positioned at a rear portion of the front body, connected with the lower body, and having the fasting member coupling hole The front body may be formed on an upper end thereof with a protrusion protruding rearward to prevent the fixer from being separated.

A height of the front body may be higher than a height of the rear body.

The pressing body may longitudinally extend in a left-right direction and may be interposed between the rear body and the fixer.

The stand may further include a guide part connected with the pressing body and passing through the rear body, and an elastic member interposed between the pressing body and the rear body, which are positioned at an outer peripheral portion of the guide part.

The pressing body may include a contact part making contact with the fixer, and a bending part bent in a direction opposite to the fixer, from an upper end of the contact part such that the bending part is inclined or rounded The fixer may include a pusher protruding rearward from a rear surface of the fixer to press the bending part in a process that the fixer is inserted into the fixer inserting body.

The stand may further include a front cover inclined down while extending forward from a front upper portion of the fixer inserting body, and a rear cover inclined down while extending rearward from a rear upper portion of the fixer inserting body.

According to an embodiment of the present invention, a display apparatus may include a display panel, a module cover disposed behind the display panel, a glass cover disposed behind the module cover, and a stand coupled to the glass cover. The stand may include a fixer to detachably insert a lower end of the glass cover therein, a fixer inserting body to detachably insert the fixer therein, and a pressing body positioned inside the fixer inserting body and pressing the fixer. The fixer inserting body may be formed therein with a fastening member coupling hole to be coupled to at least one fastening member to press the pressing body.

The glass cover may include a cover part overlapped with the module cover in a front-rear direction, and a decoration part positioned at a lower portion of the cover part and coupled to the stand.

The up-down distance between the stand and the module cover may be equal to or less than half of the up-down distance between the glass cover and the module cover.

The display panel and the module cover may be spaced apart from the stand and may be positioned above the stand.

The glass cover may be formed therein with a sound hole to emit a sound of a speaker, and the up-down distance between the fixer and the sound hole may be shorter than the up-down distance between the fixer and the display panel, and may be longer than the up-down distance between the fixer and the module cover.

According to an exemplary embodiment of the present invention, the glass cover may be firmly fixed to the stand as the pressing body presses the fixer into which the lower end of the glass cover is inserted.

In addition, the fixer is detachably inserted into the fixer inserting body, and the lower end of the glass cover is detachably inserted into the fixer, thereby easily mounting the glass cover and the stand and separating the glass cover from the stand.

In addition, the stand is mounted on the glass cover, so the display apparatus is used as the stand-type display apparatus. Alternatively, the stand is separated from the glass cover, so the display apparatus is used as the wall-mount type display apparatus.

In addition, the glass cover is not bored, but fixed to the stand. Accordingly, even when the display apparatus is used as the wall-mount type display apparatus, the aesthetic impression of the display apparatus is not degraded.

In addition, since the stand fixed to the transparent glass panel is spaced apart from the module cover and the display panel in a vertical direction, the module cover and the display apparatus may be realized to give a user the impression that the module cover and the display apparatus float in the air, and the design aesthetic impression may be improved.

Further, the fastening member presses the pressing body and the pressing body presses the fixer, thereby dispersing force such that the force is uniformly delivered, and preventing the glass cover from being broken. In addition, the number of required fastening members may be relatively reduced.

In addition, the fixer may be temporarily fixed by the pressing body through the elastic member. Accordingly, the work of coupling the fastening member may be more easily performed.

In addition, a part, which is fixed to the fixer, of the glass cover is sufficiently spaced apart from the sound hole, thereby preventing a peripheral portion of the sound hole from being cracked.

DETAILED DESCRIPTION OF THE EMBODIMENTS

Hereinafter, the detailed embodiment of the present invention will be described in detail with reference to accompanying drawings.

Figure 1:
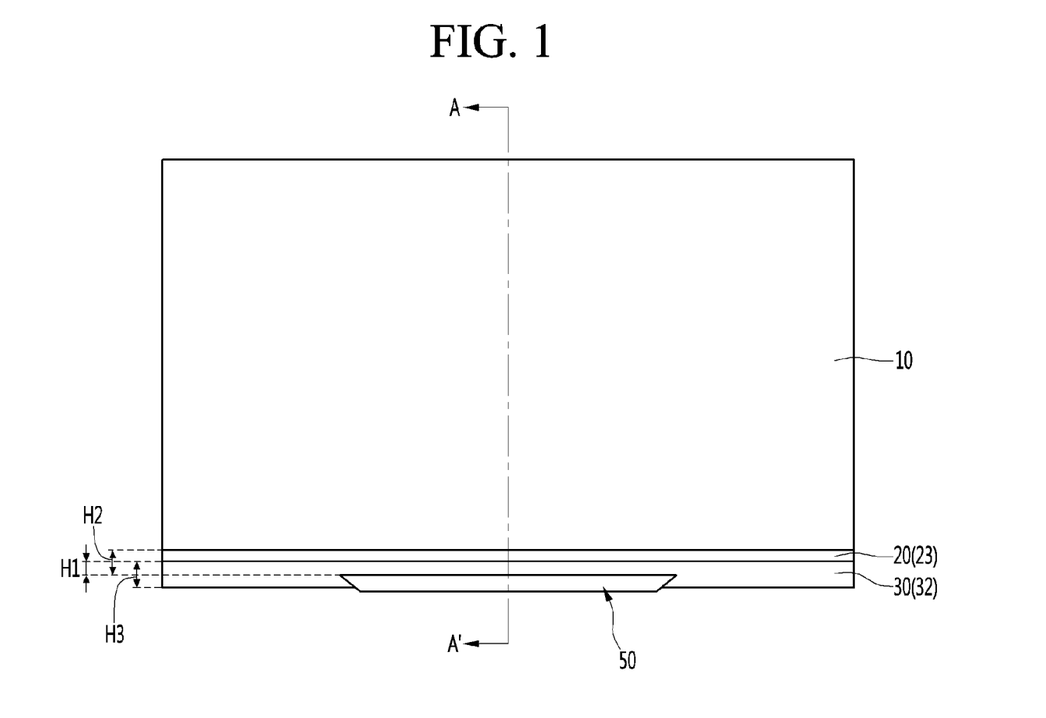
FIG. 1 is a front view of a display apparatus according to an embodiment of the present invention.
Figure 2:
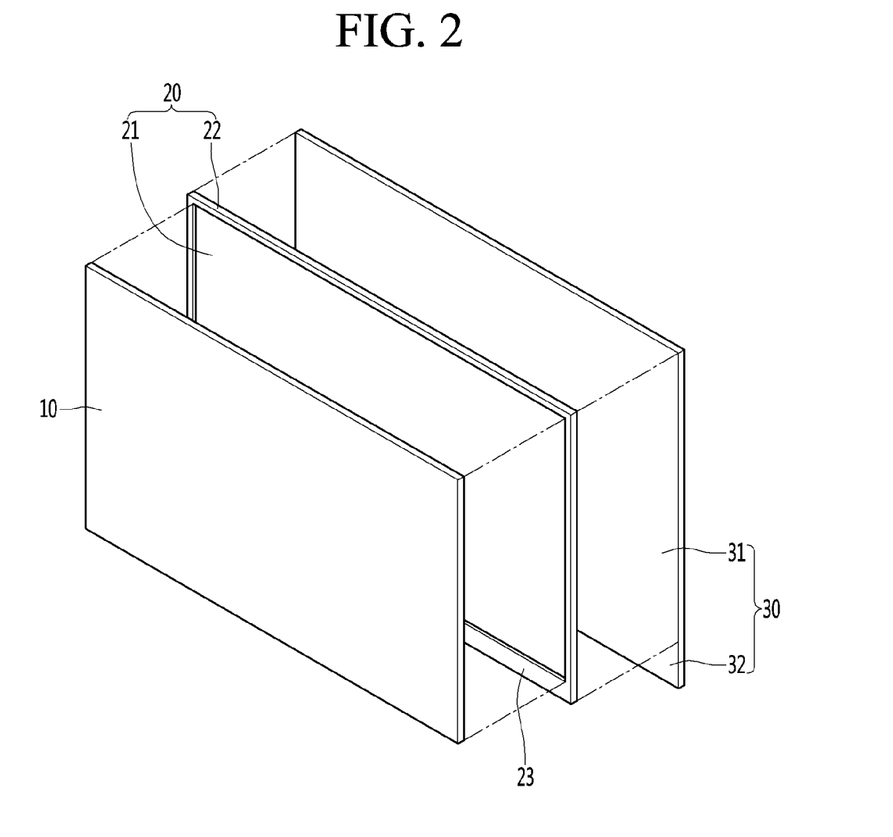
FIG. 2 is an exploded perspective view illustrating a display panel, a module cover, and a glass cover according to an embodiment of the present invention.
Figure 3:
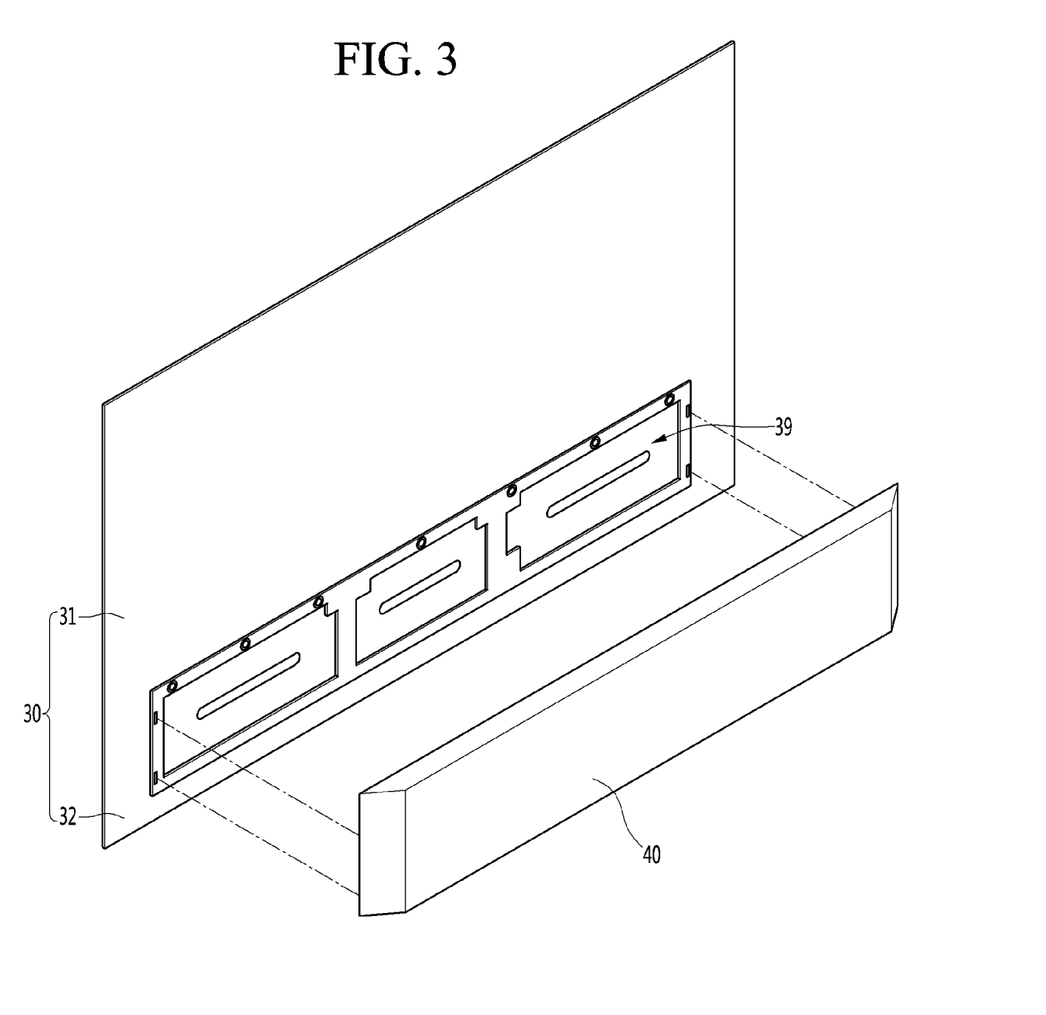
FIG. 3 is an exploded perspective view illustrating a glass cover and a back cover according to an embodiment of the present invention.

FIG. 1 is a front view of a display apparatus according to an embodiment of the present invention, FIG. 2 is an exploded perspective view illustrating a display panel, a module cover, and a glass cover according to an embodiment of the present invention, and FIG. 3 is an exploded perspective view illustrating a glass cover and a back cover according to an embodiment of the present invention.

The display apparatus according to an embodiment of the present invention may include a display panel 10, a module cover 20, a glass cover 30, a back cover 40 and a stand 50.

The display panel 10 may output an image. The display panel 10 is preferably an organic light emitting device (OLED) panel, but the present invention is not limited thereto.

The display panel 10 may have a substantially rectangular panel shape. The left-right length of the display panel 10 may be longer than the up-down length of the display panel 10. However, the present invention is not limited thereto, but the left-right length of the display panel 10 may be equal to the up-down length of the display panel 10.

The module cover 20 may cover a rear portion of the display panel 10.

The module cover 20 may radiate heat emitted from the display panel 10 and may perform EMI (Electro-Magnetic Interference) Shielding. In addition, the module cover 20 may prevent light from leaking to the rear portion and side portion of the display panel 10.

The module cover 20 may include an inner plate 21 and a middle frame 22.

The inner plate 21 may be positioned behind the display panel 10 and may cover the rear surface of the display panel 10.

The middle frame 22 may surround the outer circumferences of the display panel 10 and the inner plate 21.

The middle frame 22 and the inner plate 21 may be formed integrally with each other or formed with mutually different members. In addition, there is possible the configuration that the module cover 20 does not include the middle frame 22, but a separate sealing member covers the outer circumferences of the inner plate 21 and the display panel 10.

The glass cover 30 may be disposed behind the module cover 20.

The glass cover 30 may include a glass material. Preferably, the glass cover 30 may include a tempered glass material. The entire portion of the glass cover 30 may be formed of whole glass.

The height of the glass cover 30 may be higher than each of the heights of the display panel 10 and the module cover 20.

In more detail, the glass cover 30 may include a cover part 31 overlapping with the module cover 20 in a front-rear direction and a decoration part 32 disposed under the cover part 31.

When a user views the display apparatus from the front, the cover part 31 may not be viewed as the cover part 31 is hidden by the display panel 10 and the module cover 20. To the contrary, the decoration part 32 may be viewed by the user as the decoration part 32 is not hidden by the display panel 10 and the module cover 20.

The cover part 31 may be provided on the rear surface thereof with an electronic component mounting part 39. The electronic component mounting part 39 may be connected with the cover part 31 or may be connected with the module cover 20 while passing through the cover part 31.

Electronic components, such as a system board (SB) and a power supply (PS), may be provided in the electronic component mounting part 39.

Since the entire portion of the decoration part 32 includes transparent glass, the decoration part 32 may give a user the impression that the decoration part 32 has high-quality, so as to improve the aesthetic impression of the display apparatus.

A stand 50, which will be described later, may be coupled to the decoration part 32. The coupling between the decoration part 32 and the stand 50 will be described in detail.

The back cover 40 may cover the electronic component mounting part 39 and the electronic components mounted in the electric component mounting part 39 behind.

A speaker unit (not illustrated) may be disposed inside the back cover 40.

The size of the back cover 40 may be formed to be smaller than the size of the glass cover 30.

The back cover 40 may be provided such that the back cover 40 does not overlap with the decoration part 32 of the glass cover 30 in the front-rear direction. Therefore, when the user views the display apparatus from the front, the back cover positioned behind the decoration part 32, which is transparent, may not be viewed. Accordingly, the aesthetic impression of the display apparatus may be improved.

The stand 50 may support the display apparatus to prevent the display apparatus from falling down.

The stand 50 may be coupled to the glass cover 30, and more particularly to the decoration part 32. The display panel 10 and the module cover 20 may be positioned above the stand 50 while being spaced apart from the stand 50.

Since the decoration part 32 of the glass cover 30 is transparent, the display panel 10 and the module cover 20 may be realized to give a user the impression that the display panel 10 and the module cover 20 float in the air above the stand 50, thereby improving aesthetic impression.

The up-down distance H2 between the stand 50 and the display panel 10 may be longer than the up-down distance H1 between the stand 50 and the module cover 20.

In addition, the up-down distance H1 between the stand 50 and the module cover 20 may be equal to or less than half of the up-down distance H3 between the glass cover 30 and the module cover 20. Accordingly, the glass cover 30 may be stably fixed to the stand 50, so the display apparatus may be supported.

Figure 4:
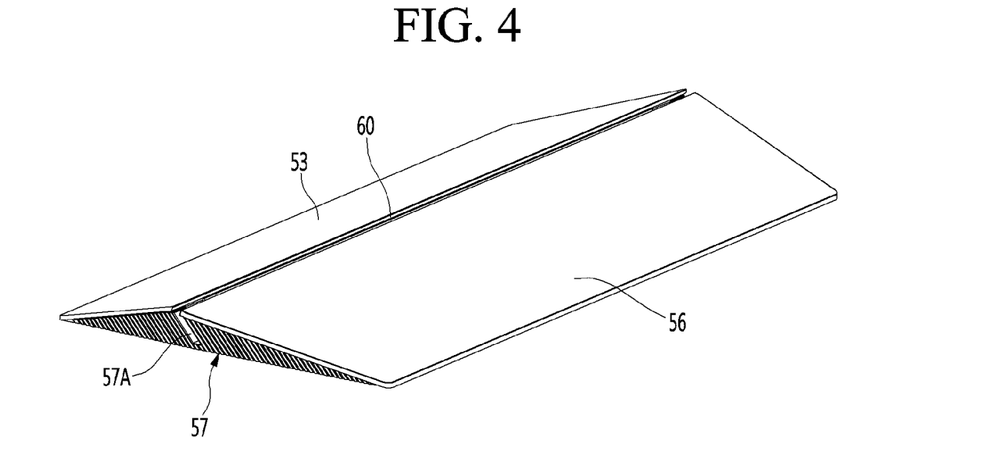
FIG. 4 is a perspective view of a stand according to an embodiment of the present invention.
Figure 5:
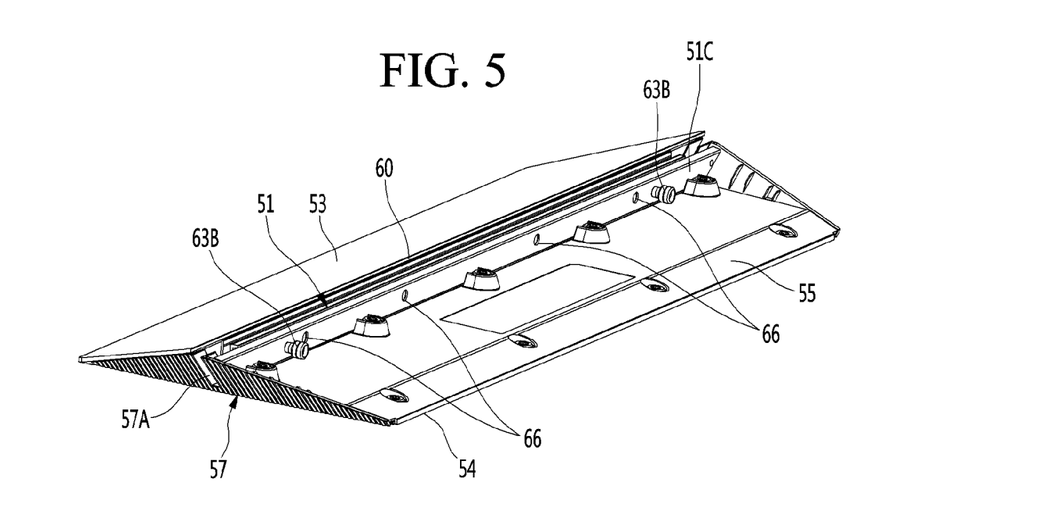
FIG. 5 is a view of a stand illustrated in FIG. 4 from which a rear cover is removed.
Figure 6:
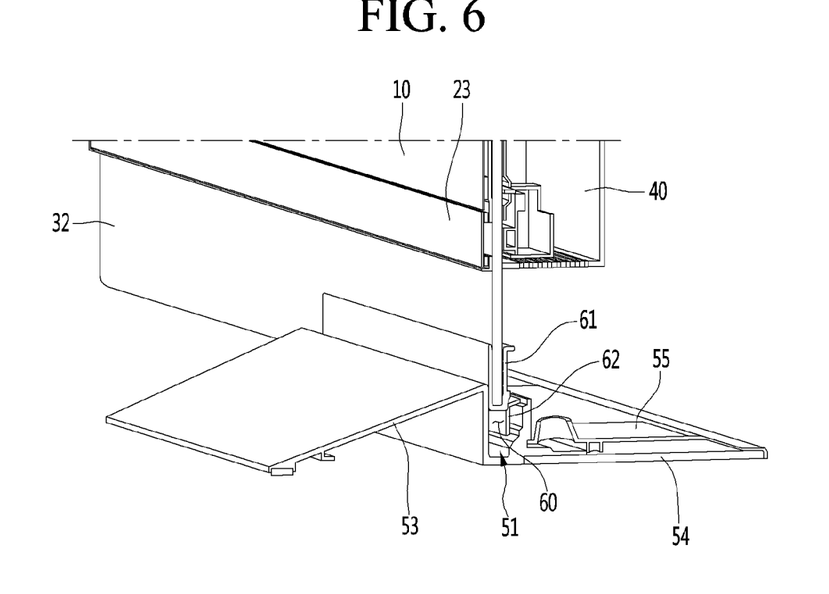
FIG. 6 is a cut-out perspective view taken along line A-A' of FIG. 1.
Figure 7:
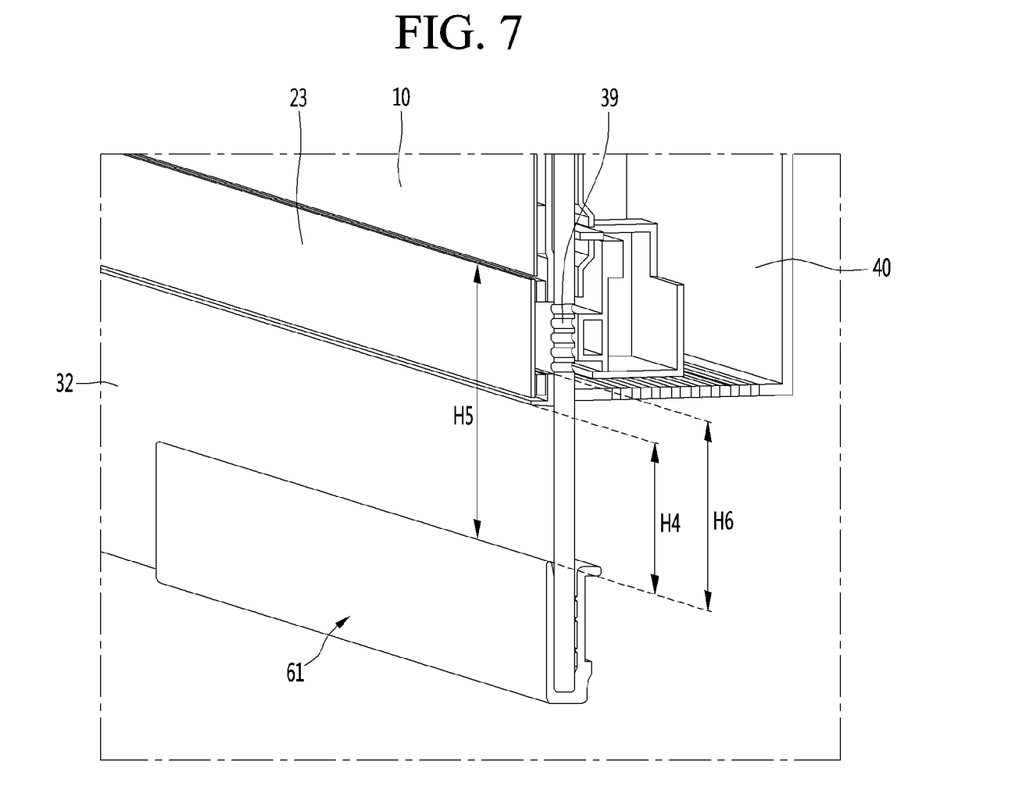
FIG. 7 is a view illustrating a sound hole formed in a glass cover.
Figure 8:
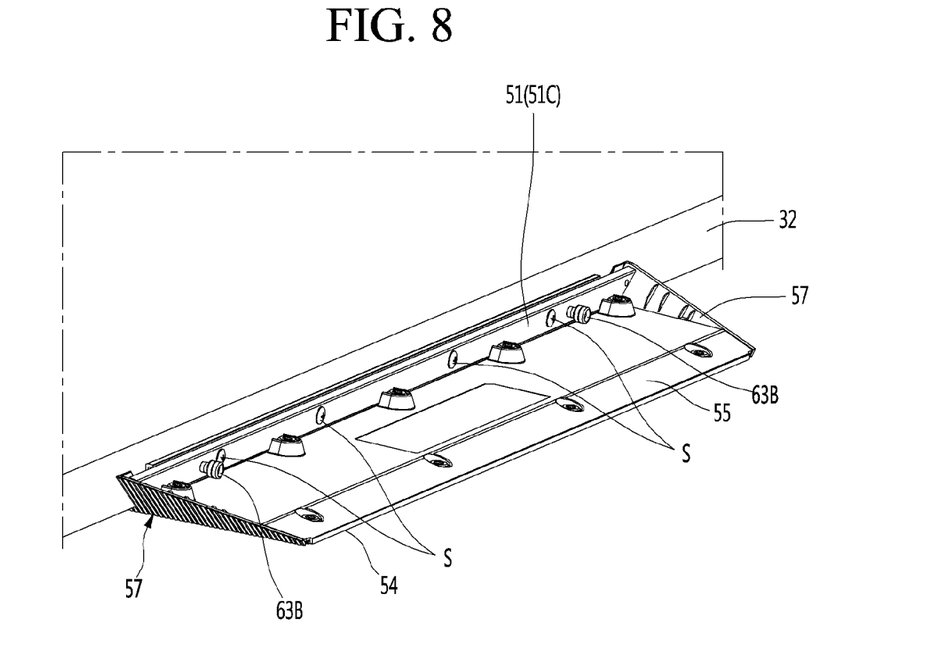
FIG. 8 is a view illustrating a stand coupled to a fastening member.
Figure 9:
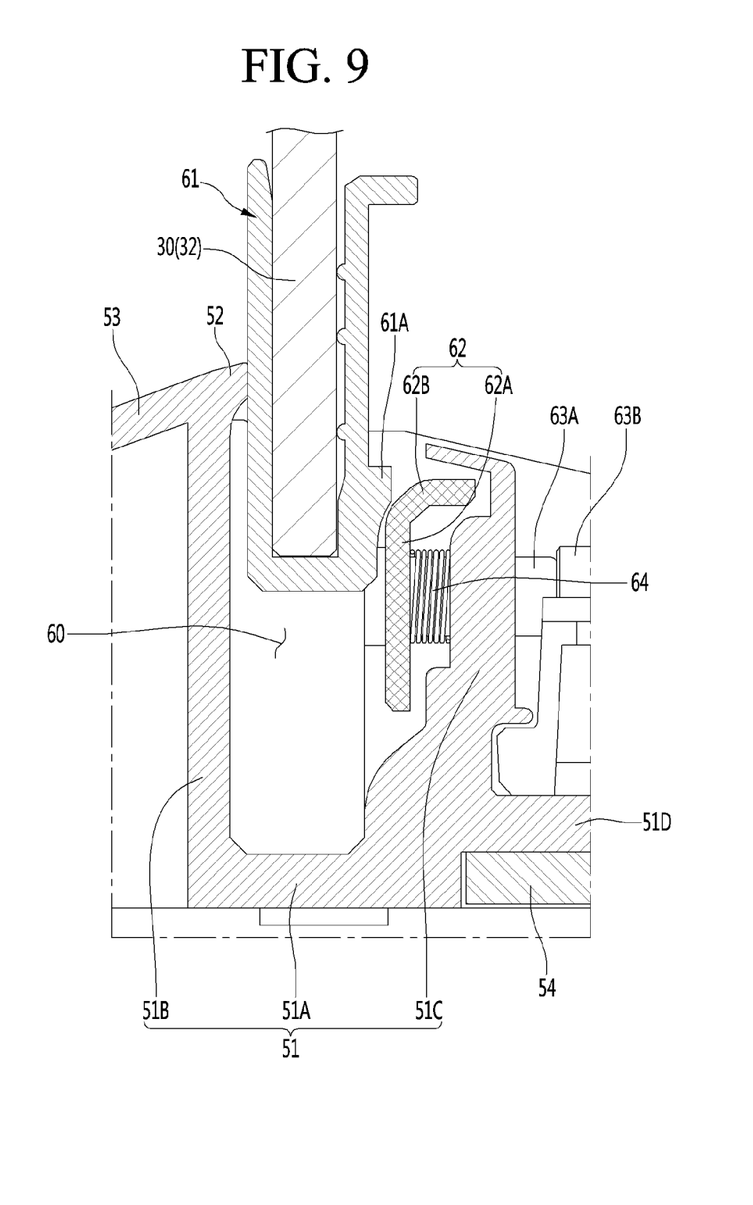
FIG. 9 is a view illustrating the procedure that a glass cover is coupled to a stand.
Figure 10:
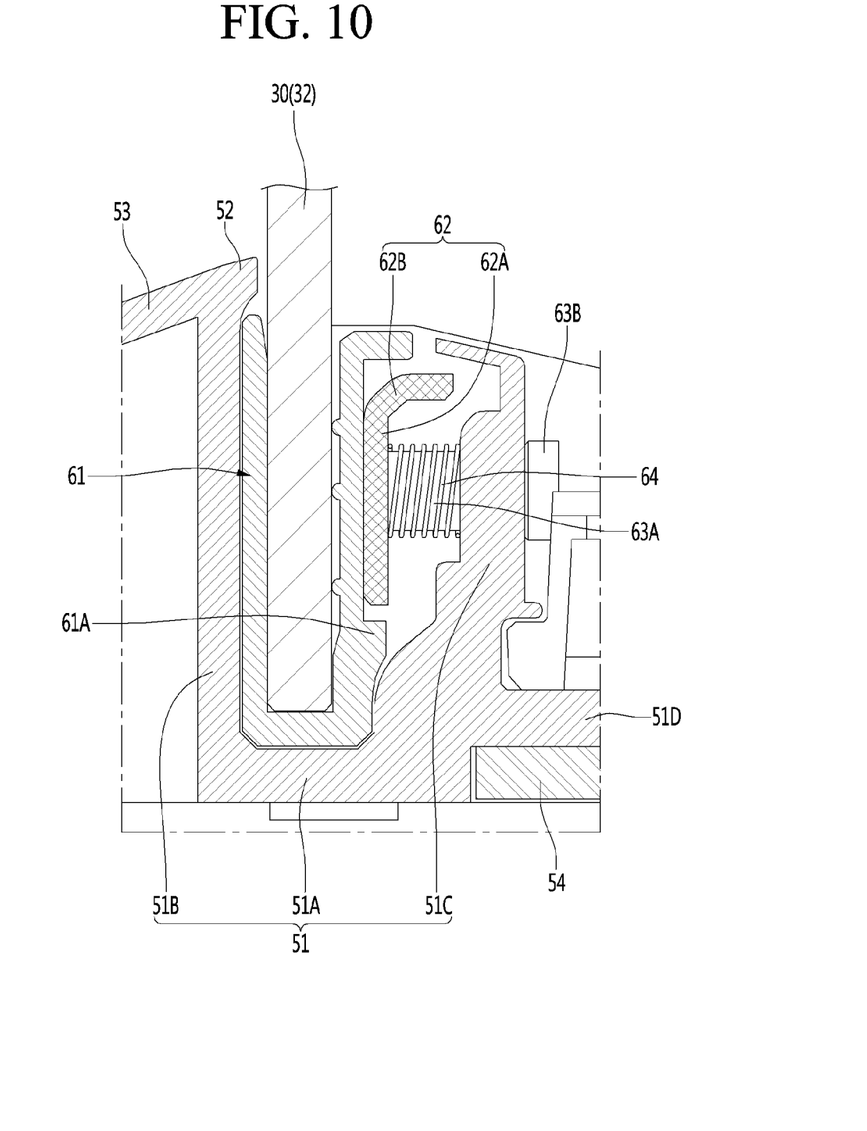
FIG. 10 is a view illustrating that a glass cover is completely coupled to a stand.

FIG. 4 is a perspective view of a stand according to an embodiment of the present invention, FIG. 5 is a view of the stand illustrated in FIG. 4 from which a rear cover is removed, FIG. 6 is a cut-out perspective view taken along line A-A' of FIG. 1, FIG. 7 is a view illustrating a sound hole formed in the glass cover, FIG. 8 is a view illustrating the stand coupled to the fastening member, FIG. 9 is a view illustrating the procedure that the glass cover is coupled to the stand, and FIG. 10 is a view illustrating that the glass cover is completely coupled to the stand.

The stand 50 may include a fixer 61, a fixer inserting body 51, and a pressing body 62.

A lower end of the glass cover 30 may be detachably inserted into the fixer 61. More specifically, a lower end of the decoration part 32 may be inserted into the fixer 61.

The fixer 61 may include an injection formed by a mold.

The sectional surface of the fixer 61 may have a shape obtained by rotating a substantial C shape at an angle of 90 degrees counterclockwise.

The fixer 61 may be formed to longitudinally extend in a left-right direction. The left-right length of the fixer 61 may be shorter than a left-right direction of the glass cover 30. The lower end of the central portion of the glass cover 30, which is positioned in a left-right direction, may be inserted into the fixer 61.

The fixer 61 coupled to the glass panel 30 may be inserted into the fixer inserting body 51 and pressed by the pressing body 62, thereby fixing the glass panel 30 to the stand 50.

The fixer 61 may be pressed by the pressing body 62, and the pressing body 62 may be pressed by a fastening member "S", such as a screw (see FIG. 8). The fixer inserting body 51 may have a fastening member coupling hole 66 (see FIG. 5) coupled to the fastening member "S".

A plurality of fastening members "S" and a plurality of fastening member coupling holes 66 may be formed.

The fixer inserting body 51, to which the fastening member "S" is fastened, may include a material having high stiffness. For example, the fixer inserting body 51 may include a metal material. The fixer inserting body 51 may be a press member.

The fixer 61 may be detachably inserted into the fixer inserting body 51. More specifically, the fixer inserting body 51 may have an inserting groove 60 formed to be open upward, and the fixer 61 may be inserted into the inserting groove 60.

The inserting groove 60 may longitudinally extend in a left-right direction along the longitudinal direction of the fixer 61 and the fixer inserting body 51.

The up-down length of the inserting groove 60 corresponding to the depth of the inserting groove 60 may be longer than the up-down length of the fixer 61 corresponding to the height of the fixer 61. Therefore, when the user views the display apparatus from the front, the fixer 61 inserted into the inserting groove 60 may not be viewed.

More specifically, the fixer inserting body 51 may include a lower body 51A, a front body 51B, and a rear body 51C.

The lower body 51A, the front body 51B, and the rear body 51C may be formed integrally with each other.

The lower body 51A may support the lower end of the fixer 61.

A rubber may be provided on the bottom surface of the lower body 51A to prevent the display apparatus from slipping over the bottom surface.

The front body 51B may protrude upward from the lower body 51A and make contact with the front surface of the fixer 61. In more detail, the front body 51B may protrude upward from a front end of the lower body 51A and may support the front surface of the fixer 61 in the front-rear direction.

The front body 51B may be formed on an upper end thereof with a protrusion 52 protruding in the rear direction to prevent the fixer 61 from being separated.

When the fixer 61 is inserted into the inserting groove 60 and mounted, the protrusion 52 may be positioned above the upper end of the front body 51B.

The rear body 51C may be spaced apart from the front body 51B in the front-rear direction and may be positioned behind the front body 51B. The rear body 51C may be connected with the lower body 51A.

The inserting groove 60 described above may refer to the gap between the front body 51B and the rear body 51C.

The rear body 51C may be spaced apart from the fixer 61 in the front-rear direction.

The fastening member coupling hole 66 described above may be formed in the rear body 51C. The fastening member coupling hole 66 may be formed through the rear body 51C.

The height of the rear body 51C may be lower than the height of the front body 51B. Since the front body 51B makes close contact with the fixer 61, the front body 51B may be preferably formed to be higher than the height of the fixer 61. In addition, since the rear body 51C is spaced apart from the fixer 61, the rear body 51C is formed to be lower than the front body 51B. Accordingly, the stand 50 may be compact.

The fixer inserting body 51 may further include a coupling body 51D coupled to a base 54 to be described later. The coupling body 51D may extend horizontally rearward from the rear surface of the rear body 51C.

Meanwhile, the pressing body 62 may press the fixer 61 to firmly fix the fixer 61 to the glass cover 30.

The pressing body 62 may be pressed by at least one fastening member "S" and may uniformly disperse the force applied by the fastening member "S". Accordingly, the pressing body 62 may include a material having high stiffness. For example, the pressing body 62 may include a metal material.

The pressing body 62 may extend in the left and right direction similarly to the fixer 61.

The pressing body 62 may be positioned inside the fixer inserting body 51. In other words, the pressing body 62 may be positioned inside the inserting groove 60.

The pressing body 62 may be interposed between the rear body 51C and the fixer 61. In other words, the pressing body 62 may press the fixer 61 from the rear portion of the fixer 61. As the pressing body 62 presses the back surface of the fixer 61, the front surface of the fixer 61 may make close contact with the front body 51B. Accordingly, the fixer 61 may be firmly fixed between the pressing body 62 and the front body 51B.

The pressing body 62 may make surface contact with the fixer 61. Accordingly, the contact area between the pressing body 62 and the fixer 61 may be widened, and the pressing body 62 may uniformly press the fixer 61.

The pressing body 62 may include a contact part 62A making contact with the fixer 61 and a bending part 62B bent from an upper end of the contact part 62A.

The contact part 62A may move forward while pressing the rear surface of the fixer 61.

The bending part 62B may be bent from an upper end of the contact part 62A in a direction opposite to the fixer 61. The bending part 62B may be inclined or rounded.

The fixer 61 may have a pusher 61A protruding rearward from the rear surface of the fixer 61. The pusher 61A may press the bending part 62B of the pressing body 62 in the process of inserting the fixer 61 into the fixer inserting body 51. Since the bending part 62B is inclined or rounded, when the pusher 61A presses the bending part 62B in the process that the fixer 61 moves down, the pressing body 62 may move rearward.

The pusher 61A may be positioned below the pressing body 62 when the fixer 61 is completely inserted into the inserting groove 60.

Meanwhile, the stand 50 may further include a guide part 63A connected with the pressing body 62 while passing through the rear body 51C and a limiter 63B connected with the guide part 63A.

The guide part 63A may protrude rearward from the rear surface of the pressing body 62 to pass through the rear body 51C. In more detail, the rear body 51C may be formed therein with a through hole through which the guide part 63A passes.

The guide part 63A may guide the forward and backward movement of the pressing body 62.

To prevent rotation of the pressing body 62, it is preferable that two or more guide parts 63A are formed.

The limiter 63B may be provided at the end of the guide part 63A. In other words, the limiter 63B may be positioned at a rear portion of the rear body 51C. The limiter 63B may be formed to have a size to the extent that the limiter 63B does not pass through the through hole through which the guide part 63A passes. Accordingly, the limiter 63B may limit the moving radius of the pressing body 62 in the longitudinal direction.

For example, the guide part 63A may include a pem nut protruding from the pressing body 62, and the limiter 63B may include a head portion of a bolt coupled to the pem nut.

Meanwhile, the stand 50 may further include an elastic member 64 to provide elastic force to the pressing body 62. The elastic member 64 may provide elastic force to the pressing body 62 in the direction of pressing the fixer 61.

The elastic member 64 may be positioned inside the fixer inserting body 51. In more detail, the elastic member 64 may be interposed between the pressing body 62 and the rear body 51C. In more detail, the elastic member 64 may be interposed between the pressing body 62 and the rear body 51C, which are positioned at the outer peripheral portion of the guide part 63A.

The fixer 61 inserted into the inserting groove 60 may be temporarily fixed to the fixer inserting body 51 by the elastic member 64 before coupled by the fastening member "S". Accordingly, work of coupling the fastening member "S" to the fastening member coupling hole 66 may be more easily performed.

Meanwhile, the stand 50 may further include a base 54, an inner cover 55, a front cover 53, a rear cover 56, and a side cover 57.

The base 54 may constitute at least a portion of a bottom surface of the stand 50. The base 54 may be coupled to a coupling body 51D of the fixer inserting body 51. In more detail, the base 54 may be disposed on the bottom surface of the coupling body 51D and may be coupled to the coupling body 51D by a separate coupling member.

The bottom surface of the base 54 may be positioned on the same plane as that of the bottom surface of the lower body 51A of the fixer inserting body 51.

The front-rear length of the base 54 may be longer than the front-rear length of the coupling body 51D. Accordingly, the stand 50 may be more stably supported by the base 54.

The inner cover 55 may cover upper portions of the base 54 and the coupling body 51D.

The inner cover 55 may be coupled to at least one of the base 54 and the coupling body 51D. In more detail, the inner cover 55 may be disposed on the upper portions of the base 54 and the coupling body 51D and may be coupled to at least one of the base 54 and the coupling body 51D by a separate coupling member.

The front cover 53 may be formed to be inclined down while extending forward from a front upper portion of the fixer inserting body 51. The front cover 53 may be disposed to be inclined down while extending forward from an upper end of the front body 51B.

The front cover 53 may be formed integrally with the fixer inserting body 51.

The front cover 53 may prevent the display apparatus from falling down forward.

The rear cover 56 may be formed to be inclined down while extending rearward from a rear upper portion of the fixer inserting body 51. In more detail, the rear cover 56 may be disposed to be inclined down while extending from the upper end of the rear body 51C to the rear end of the base 54.

The rear cover 56 may be coupled to the inner cover 55.

The rear cover 56 may prevent the display apparatus from falling down rearward, together with the base 54 and the inner cover 55.

The rear cover 56 may cover an upper portion of the inner cover 55. In addition, the rear cover 56 may prevent the fastening member "S", which is coupled to the rear body 51C and the limiter 63B, which is positioned at the rear portion of the rear body 51C, from being exposed to the outside. Accordingly, the aesthetic impression in design of the stand 50 may be improved.

A pair of left and right side covers 57 may be provided. The side covers 57 may form a left side surface and a right side surface of the stand 50.

Each side cover 57 may be connected with a left or right end of the front cover 53, the rear cover 56, and the base 54.

Each side cover 57 may have a groove 57A (see FIG. 4) connected to the inserting groove 60. Accordingly, even if the left-right length of the glass cover 30 is longer than the left-right length of the stand 50, the glass cover 30 may be inserted into and fixed to the stand 50.

Meanwhile, referring to FIG. 7, the cover part 31 of the glass cover 30 may be formed therein with a sound hole 39 to emit the sound from a speaker. The speaker may be positioned inside the back cover 40.

A grill 23 may be provided at a lower end of the display panel 10, and the sound hole 39 may overlap with the grill 23 in the front-rear direction. The up-down distance H6 between the fixer 61 and the sound hole 39 may be shorter than the up-down distance H5 between the fixer 61 and the display panel 10, and may be lower than the up-down distance H4 between the fixer 61 and the module cover 20.

A plurality of through holes (not illustrated) may be formed in the grill 23 to radiate a sound to the outside through the sound hole 39.

The sound hole 39 may be formed through the glass cover 30 in the front-rear direction. Since the peripheral portion of the sound hole 39 may be relatively weak for an impact, a part, which is fitted into the fixer 61, of the glass cover 30 may be spaced apart from the sound hole 39 by a predetermined distance.

Hereinafter, the coupling method between the glass cover 30 and the stand 50 will be described.

The coupling between the glass cover 30 and the stand 50 may be performed in the state that the rear cover 56 of the stand 50 is separated.

The glass cover 30, in more detail, the lower end of the decoration part 32 may be fitted into the fixer 61 and fixed to the fixer 61. Thereafter, the fixer 61 may be inserted into the inserting groove 60 of the fixer inserting body 51 in the state of being fitted around the glass cover 30.

When the pusher 61A of the fixer 61 presses the bending part 62B of the pressing body 62 in the process that the fixer 61 is inserted into the inserting groove 60, the pressing body 62 may be pushed rearward, and the fixer 61 may move down in the state that the pusher 61A makes contact with the contact part 62A. Accordingly, the fixer 61 may be easily inserted into the inserting groove 60.

When the fixer 61 is completely inserted into the inserting groove 60, the pressing body 62 may press the rear surface of the fixer 61 by elastic force of the elastic member 64. Accordingly, the fixer 61 may be temporarily fixed into the inserting groove 60.

In this state, the fastening member "S" may be coupled to the fastening member coupling hole 66 formed in the rear body 51C of the fixer inserting body 51. The fastening member "S" may press forward the rear surface of the pressing body 62, and the pressing body 62 may press the rear surface of the fixer 61 forward. Accordingly, the fixer 61 may be firmly fixed without being shaken.

Thereafter, the rear cover 56 is coupled to the inner cover 55, thereby completing the work.

The separation of the glass cover 30 from the stand 50 may be performed reversely to order of coupling between the glass cover 30 and the stand 50.

When the glass cover 30 is separated from the stand 50, a worker may release the fastening member "S" and then may push the limiter 63B or move rearward the pressing body 62. Then, the worker may separate the glass cover 30. In other words, the limiter 63B may serve as a grip part.

While the present invention has been described with reference to exemplary embodiments, it will be apparent to those skilled in the art that various changes and modifications may be made without departing from the spirit and scope of the present invention.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

What is claimed is:

1. A stand of a display apparatus, comprising:
    a fixer to detachably insert a lower end of a glass cover therein;
    a fixer inserting body to detachably insert the fixer therein; and
    a pressing body positioned inside the fixer inserting body and pressing the fixer,
    wherein the fixer inserting body is formed therein with at least one fastening member coupling hole to be coupled to a fastening member to press the pressing body,
    wherein the fixer inserting body includes:
    a lower body to support a lower end of the fixer;
    a front body protruding upward from the lower body and making contact with a front surface of the fixer; and
    a rear body spaced apart from the front body, positioned behind the front body, connected with the lower body, and having a fasting member coupling hole, and
    wherein the pressing body longitudinally extends in a left-right direction and is interposed between the rear body and the fixer.

2. The stand of claim 1, further comprising:
    an elastic member positioned inside the fixer inserting body to provide elastic force to the pressing body in a direction of pressing the fixer.

3. The stand of claim 1, wherein the pressing body makes contact with the fixer.

4. The stand of claim 1, wherein a protrusion protrudes rearward from an upper end of the front body to prevent the fixer from being separated.

5. The stand of claim 1, wherein a height of the front body is higher than a height of the rear body.

6. The stand of claim 1, further comprising:
    a guide part connected with the pressing body and passing through the rear body; and
    an elastic member interposed between the pressing body and the rear body, which are positioned at an outer peripheral portion of the guide part.

7. The stand of claim 1, further comprising:
    a front cover inclined down while extending forward from a front upper portion of the fixer inserting body; and
    a rear cover inclined down while extending rearward from a rear upper portion of the fixer inserting body.

8. A stand of a display apparatus, comprising:
    a fixer to detachably insert a lower end of a glass cover therein;
    a fixer inserting body to detachably insert the fixer therein; and
    a pressing body positioned inside the fixer inserting body and pressing the fixer, wherein the fixer inserting body is formed therein with at least one fastening member coupling hole to be coupled to a fastening member to press the pressing body, and wherein the pressing body includes:

a contact part making contact with the fixer; and a bending part bent in a direction opposite to the fixer, from an upper end of the contact part such that the bending part is inclined or rounded.

9. The stand of claim 8, wherein the fixer includes:

a pusher protruding rearward from a rear surface of the fixer to press the bending part in a process that the fixer is inserted into the fixer inserting body.

10. The stand of claim 8, further comprising:

a front cover inclined down while extending forward from a front upper portion of the fixer inserting body; and a rear cover inclined down while extending rearward from a rear upper portion of the fixer inserting body.

11. A display apparatus comprising:

a display panel;

a module cover disposed behind the display panel;

a glass cover disposed behind the module cover; and a stand coupled to the glass cover, wherein the stand includes:

a fixer to detachably insert a lower end of the glass cover therein;

a fixer inserting body to detachably insert the fixer therein; and a pressing body positioned inside the fixer inserting body and pressing the fixer, wherein the fixer inserting body is formed therein with at least one fastening member coupling hole to be coupled to a fastening member to press the pressing body, wherein the display panel and the module cover are spaced apart from the stand and positioned above the stand, wherein the glass cover is formed therein with a sound hole to emit a sound of a speaker, and wherein an up-down distance between the fixer and the sound hole is shorter than an up-down distance between the fixer and the display panel, and longer than an up-down distance between the fixer and the module cover.

12. The display apparatus of claim 11, wherein the glass cover includes:

a cover part overlapped with the module cover in a front-rear direction; and a decoration part positioned at a lower portion of the cover part and coupled to the stand.

13. The display apparatus of claim 11, wherein an up-down distance between the stand and the module cover is equal to or less than half of an up-down distance between the glass cover and the module cover.

14. The display apparatus of claim 11, wherein the fixer inserting body includes:

a lower body to support a lower end of the fixer;

a front body protruding upward from the lower body and making contact with a front surface of the fixer; and a rear body spaced apart from the front body, positioned at a rear portion of the front body, connected with the lower body, and having the fasting member coupling hole.

15. The display apparatus of claim 14, wherein the front body is formed on an upper end thereof with a protrusion protruding rearward to prevent the fixer from being separated.

16. The display apparatus of claim 14, wherein a height of the front body is higher than a height of the rear body.

17. A display apparatus comprising:

a display panel;

a module cover disposed behind the display panel;

a glass cover disposed behind the module cover; and a stand coupled to the glass cover, wherein the stand includes:

a fixer to detachably insert a lower end of the glass cover therein;

a fixer inserting body to detachably insert the fixer therein; and a pressing body positioned inside the fixer inserting body and pressing the fixer, wherein the fixer inserting body is formed therein with at least one fastening member coupling hole to be coupled to a fastening member to press the pressing body, wherein the fixer inserting body includes:

a lower body to support a lower end of the fixer;

a front body protruding upward from the lower body and making contact with a front surface of the fixer; and a rear body spaced apart from the front body, positioned at a rear portion of the front body, connected with the lower body, and having the fasting member coupling hole, and wherein the pressing body longitudinally extends in a left-right direction and is interposed between the rear body and the fixer.

* * * * *